(12) United States Patent
Sato et al.

(10) Patent No.: US 6,702,714 B2
(45) Date of Patent: Mar. 9, 2004

(54) APPARATUS FOR CONTROLLING VEHICLE AUTOMATIC TRANSMISSION

(75) Inventors: Toshimitsu Sato, Toyota (JP); Kazuyuki Watanabe, Anjo (JP); Shinji Kato, Auderghem (BE); Naoyuki Sakamoto, Toyota (JP); Atsushi Ayabe, Toyota (JP); Hiromichi Kimura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/205,470

(22) Filed: Jul. 26, 2002

(65) Prior Publication Data

US 2003/0054911 A1 Mar. 20, 2003

(30) Foreign Application Priority Data

Jul. 30, 2001 (JP) ........................................ 2001-229598

(51) Int. Cl.$^7$ ............................................... F16H 61/04
(52) U.S. Cl. ........................ 477/146; 477/150; 477/151; 701/59
(58) Field of Search ................................. 477/143, 146, 477/151, 150, 145; 701/59

(56) References Cited

U.S. PATENT DOCUMENTS

| | | | | |
|---|---|---|---|---|
| 4,928,557 A | * | 5/1990 | Takada et al. | 477/151 |
| 4,969,098 A | * | 11/1990 | Leising et al. | 701/59 |
| 5,063,814 A | * | 11/1991 | Baba et al. | 477/161 |
| 5,182,970 A | * | 2/1993 | Goto et al. | 477/151 |
| 5,293,789 A | * | 3/1994 | Goto et al. | 477/151 |
| 5,667,457 A | * | 9/1997 | Kuriyama et al. | 477/143 |
| 5,695,423 A | * | 12/1997 | Hirose | 475/129 |
| 5,800,309 A | * | 9/1998 | Takiguchi et al. | 477/151 |
| 5,857,935 A | * | 1/1999 | Takiguchi | 475/151 |
| 5,865,707 A | * | 2/1999 | Shimada et al. | 477/145 |
| 5,879,268 A | * | 3/1999 | Yasue et al. | 477/143 |
| 5,899,831 A | * | 5/1999 | Takiguchi | 477/151 |
| 5,913,748 A | * | 6/1999 | Takiguchi | 477/148 |
| 5,921,885 A | * | 7/1999 | Tabata et al. | 477/143 |
| 6,132,334 A | * | 10/2000 | Tabata et al. | 477/143 |
| 6,224,507 B1 | * | 5/2001 | Shimoyama et al. | 475/129 |

FOREIGN PATENT DOCUMENTS

| | | | |
|---|---|---|---|
| JP | 1-150049 | 6/1989 | |
| JP | 1-150056 | * 12/1989 | ............. F16H/5/66 |
| JP | 11-30324 | 2/1999 | |
| JP | 2000-205403 | 7/2000 | |

* cited by examiner

Primary Examiner—Rodney H. Bonck
Assistant Examiner—Eric M. Williams
(74) Attorney, Agent, or Firm—Oblon, Spivak, McClelland, Maier & Neustadt, P.C.

(57) ABSTRACT

An apparatus for controlling a vehicle automatic transmission having a hydraulically operated frictional coupling device operable to effect a shifting action of the automatic transmission, and an accumulator connected to the frictional coupling device, the apparatus including an accumulator-back-pressure learning compensation device operable to effect learning compensation of a back pressure of the accumulator such that an actual value of a rate of change of a rotating speed of a selected rotary element of the automatic transmission, which rotating speed changes as a result of the shifting action, approaches a predetermined target value, and an accumulator-back-pressure control device operable to control the back pressure, on the basis of an output of the accumulator-back-pressure leaning compensation device, whereby a shifting shock of the transmission can be reduced.

6 Claims, 8 Drawing Sheets

| POSITION | | CLUTCHES AND BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| D | 2nd | ○ | × | × | ○ | × | × | ○ | × | △ |
| D | 3rd | ○ | ○ | × | × | × | × | ○ | × | △ |
| D | 4th | × | ○ | × | ○ | × | × | ○ | × | △ |
| D | 5th | × | ○ | × | ○ | × | ○ | × | × | × |
| 1st-SPEED ENGIN BRAKE | | ○ | × | × | × | ○ | × | ○ | △ | △ |

APPARATUS FOR CONTROLLING VEHICLE AUTOMATIC TRANSMISSION

This application is based on Japanese Patent Application Nos. 2001-229598 filed on Jul. 30, 2001, the contents of which are incorporated hereinto by reference.

BACKGROUND OF THE INVENTION

1. Field of the Invention

The present invention relates in general to an apparatus for controlling an automatic transmission for an automotive vehicle, and more particularly to techniques for minimizing a shifting shock of the automatic transmission upon a shift-down action of the automatic transmission while an accelerator pedal of the vehicle is in an operated state.

2. Discussion of Related Art

For an automotive vehicle, there is known an automatic transmission which has a plurality of hydraulically operated frictional coupling devices operable with pressurized fluid supplied from accumulators and which is shifted by engaging and releasing actions of selected ones of those frictional coupling devices. There is widely known an automatic transmission control apparatus arranged to control a hydraulic engaging pressure of such a hydraulically operated frictional coupling device such that the hydraulic engaging pressure is changed at a controlled low rate, so as to reduce or minimize a shifting shock of the automatic transmission. JP-A-1-150049 discloses an example of such an automatic transmission control apparatus, which is arranged to control shift-down actions of the automatic transmission, by learning compensation of a back-pressure of the accumulator for a frictional coupling device associated with a shift-down action of the transmission. This control apparatus is adapted to effect the learning compensation of the back-pressure of the accumulator, depending upon a shifting time of the automatic transmission, so as to effectively reduce the shifting shock, irrespective of a variation in the actual friction coefficient of the specific frictional coupling device with respect to a nominal value, or a chronological change in the friction coefficient during use of the frictional coupling device.

Such a vehicle automatic transmission control apparatus arranged to control the back pressure of the accumulator on the basis of the shifting time of the automatic transmission does not permit the accumulator to perform the intended function of reducing the rate of change of, or slowing changing the hydraulic engaging pressure of the corresponding frictional coupling device, where the shifting time has a large amount of variation that may cause the accumulator to be inoperable. In this case, the automatic transmission operated under the control of the control apparatus undesirably suffers from a large shifting shock.

SUMMARY OF THE INVENTION

The present invention was made in the light of the background art discussed above. It is therefore an object of the present invention to provide an apparatus for controlling a vehicle automatic transmission, which apparatus permits effective reduction of a shifting shock of an automatic transmission, irrespective of a variation in the shifting time of the transmission.

The object indicated above may be achieved according to the principle of this invention, which provides an apparatus for controlling a vehicle automatic transmission having a hydraulically operated frictional coupling device operable to effect a shifting action of the automatic transmission, and an accumulator connected to the frictional coupling device, said apparatus comprising: (a) accumulator-back-pressure learning compensation means for effecting learning compensation of a back pressure of the accumulator such that an actual value of a rate of change of a rotating speed of a selected one of rotary elements of the automatic transmission, which rotating speed changes as a result of the shifting action, approaches a predetermined target value; and (b) accumulator-back-pressure control means for controlling the back pressure of the accumulator, on the basis of an output of the accumulator-back-pressure leaning compensation means.

In the automatic transmission control apparatus of the present invention constructed as described above, the accumulator-back-pressure learning compensation means is arranged to effect the learning compensation of the back pressure of the accumulator such that the actual value of the rate of change of the rotating speed of the selected rotary element approaches the predetermined target value, so that the shifting shock of the automatic transmission can be more effectively reduced irrespective of a variation in the shifting time of the automatic transmission, than in the prior art in which the learning compensation of the back pressure of the accumulator is based on the shifting time. The present automatic transmission control apparatus prevents the accumulator from being inoperable, even where the shifting time of the automatic transmission has a large amount of variation, thus enabling the accumulator to perform the intended function of reducing the rate of change of the hydraulic engaging pressure of the frictional coupling device, to thereby effectively reduce the shifting shock of the automatic transmission.

According to a first preferred form of the present invention, the accumulator-back-pressure learning compensation means effects the learning compensation of the back pressure of the accumulator such that an actual value of an inertia-phase-start time approaches a predetermined second target value while the actual value of the rate of change approaches the predetermined first target value. The inertia-phase-start time is defined as a period of time from a moment at which the automatic transmission is commanded to effect the shifting action, to a moment of initiation of a change of the rotating speed of the selected rotary element as a result of the shifting action. This arrangement is effective to prevent the accumulator from being inoperable due to an excessively large amount of variation in the shifting time of the automatic transmission, and assures an improved stability in the function of the accumulator of reducing the rate of change of the hydraulic engaging pressure of the frictional coupling device, so as to effectively reduce the shifting shock of the automatic transmission.

According to a second preferred form of this invention, the shifting action of the automatic transmission is effected by a releasing action of the hydraulically operated frictional coupling device and an engaging action of a one-way clutch, and the accumulator-back-pressure learning compensation means effects the learning compensation of the back pressure of the accumulator such that the one-way clutch is engaged while a pressurized fluid is fed into an accumulator chamber of the accumulator. This arrangement is effective to reduce the shifting shock of the transmission upon engagement of the one-way clutch.

According to a third preferred form of this invention, the automatic transmission is adapted to a front-engine front-drive vehicle, and includes a main shifting portion disposed on an input shaft thereof, and an under drive portion disposed on a counter shaft which is spaced from and parallel to the input shaft, and the shifting action is a shift-down action which takes place in the under drive portion, the selected rotary element consisting of an input member of the under drive portion. This arrangement is effective to reduce the shifting shock of the automatic transmission which is arranged for use on the FF vehicle and which includes the under drive portion disposed on the counter shaft parallel to the input shaft on which the main shifting portion is disposed.

In one advantageous arrangement of the above-indicated third preferred form of this invention, the under drive portion of the automatic transmission includes a clutch which is provided as the hydraulically operated frictional coupling device and which is released to effect the shift-down action, and the accumulator is connected to the clutch to slowly change a hydraulic engaging pressure of the clutch in the process of a releasing action of the clutch. This arrangement is effective to reduce the shifting shock of the automatic transmission upon the shift-down action involving the releasing action of the clutch, irrespective of the shifting time of the transmission.

In the automatic transmission control apparatus according to the above-indicated advantageous arrangement of the third preferred form of the invention, the accumulator-back-pressure learning compensation means may be arranged to effect the learning compensation of the back pressure of the accumulator such that the back pressure is lowered when the rate of change of the rotating speed of the input member of the under drive portion of the automatic transmission is lower than a predetermined target value in the process of the shift-down action which takes place during an operation of an accelerator pedal provided on the front-engine front-drive vehicle. This arrangement is effective to reducing the shifting shock upon the shift-down action, irrespective of a variation of the shifting time.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
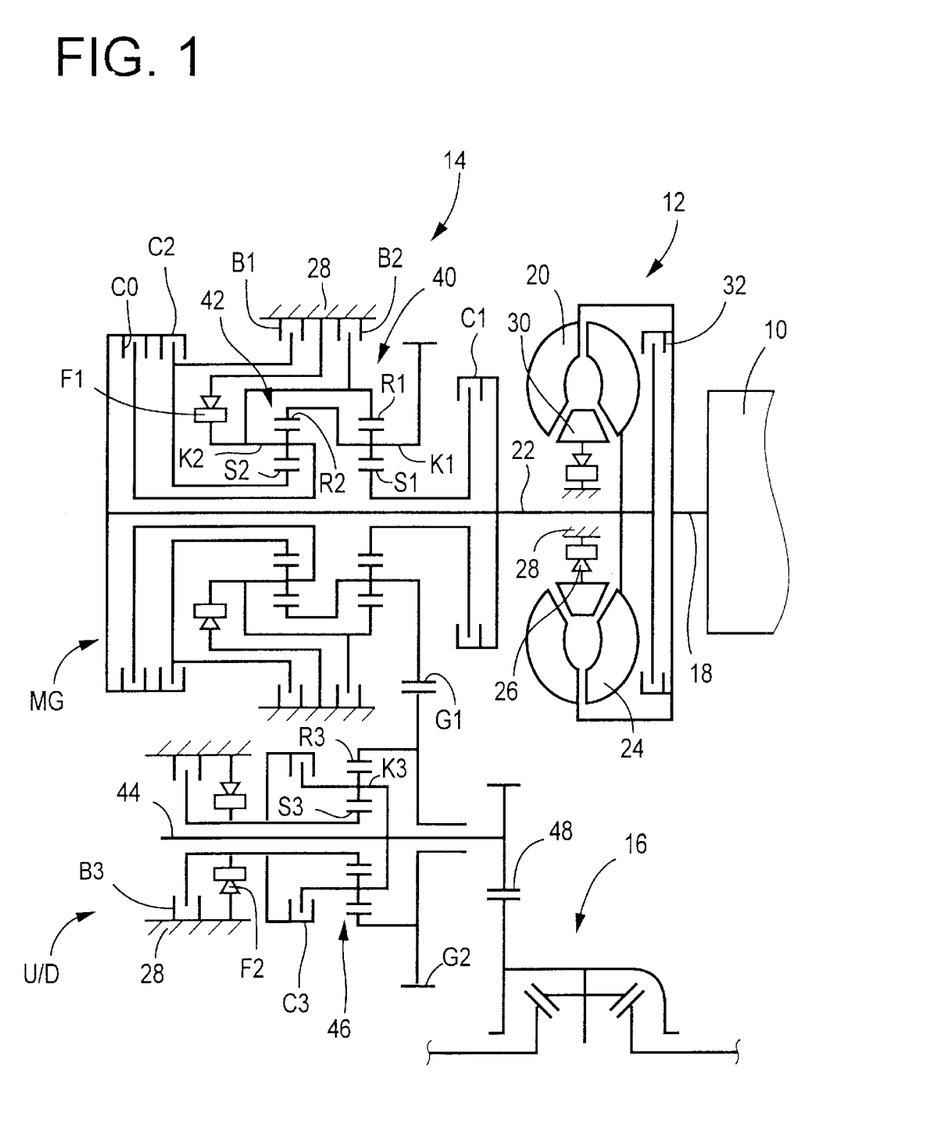
FIG. 1 is a schematic view showing an arrangement of a vehicle drive system to which an automatic transmission control apparatus according to the present invention is applicable.

Referring first to the schematic view of FIG. 1, there is shown an arrangement of a vehicle drive system of a transverse FF (front-engine front-drive) vehicle. The vehicle drive system includes a drive power source in the form of an engine 10, a fluid-operated power transmitting device in the form of a torque converter 12, an automatic transmission 14, and a differential gear device 16. An output of the engine 10 is transmitted to front drive wheels (not shown) of the vehicle through the torque converter 12, automatic transmission 14 and differential gear device 16. The torque converter 12 includes a pump impeller 20 connected to a crankshaft 18 of the engine 10, a turbine impeller 24 connected to an input shaft 20 of the automatic transmission 14, a stator 30 fixed through a one-way clutch 26 to a stationary member in the form of a housing 28, and a lock-up clutch 32 connected to the input shaft 22 through a damper (not shown).

The automatic transmission 14 includes a planetary gear mechanism of so-called "CR-CR connection" type consisting of a first single-pinion planetary gear set 40 and a second single-pinion planetary gear set 42 which are disposed coaxially with each other on the input shaft 22 and which are constructed such that ring gears R1, R2 of the first and second planetary gear sets 40, 42 are connected to respective carriers K2, K1 of the second and first planetary gear sets 42, 40. The automatic transmission 14 further includes a third planetary gear set 46 disposed on a counter shaft 44 parallel to the input shaft 22, and an output gear 48 which is fixed to one end of the counter shaft 44 and which meshes with the differential gear device 16. Each of the first, second and third planetary gear sets 40, 42, 46 has rotary elements in the form of a gun gear S, a ring gear R, a planetary gear meshing with the sun gear and the ring gear, and a carrier K rotating supporting the planetary gear. Selected ones of the sun gears, ring gears and carriers of the three planetary gear sets 40, 42, 46 are connected to each other through selected ones of four clutches C0, C1, C2 and C3, and are fixed to the housing 28 (stationary member) through selected ones of three brakes B1, B2 and B3. Further, selected ones of the rotary elements are connected to each other or fixed to the housing 28, through two one-way clutches F1 and F2, depending upon the direction of rotation of the rotary elements. Since the differential gear device 16 is symmetrical with respect to its axis (front axles), only an upper half of the differential gear device 16 is shown in FIG. 1.

The first and second planetary gear sets 40, 42 disposed on the input shaft 22, the clutches C0, C1 and C2, the brakes B1 and B2, and the one-way clutch F1 cooperate to constitute a main shifting portion MG which is operable to establish four forward drive positions and one rear drive position. On the other hand, the third planetary gear set 46 disposed on the counter shaft 44, the clutch C3, the brake B3 and the one-way clutch F2 cooperate to constitute an auxiliary shifting portion or under drive portion U/D. In the main shifting portion MG, the input shaft 22 is connected to the carrier K2 of the second planetary gear set 42, the sun gear S1 of the first planetary gear set 40, and the sun gear S2 of the second planetary gear set 42, through the clutches C0, C1 and C2, respectively. The ring gear R1 of the first planetary gear set 40 is connected to the carrier K2 of the second planetary gear set 42, while the ring gear R2 of the second planetary gear set 42 is connected to the carrier K1 of the first planetary gear set 40. The sun gear S2 of the second planetary gear set 42 is fixed to the stationary member in the form of the housing 28 through the brake B1, while the ring gear R1 of the first planetary gear set 40 is fixed to the housing 28 through the brake B2. The one-way clutch F1 is disposed between the carrier K2 of the second planetary gear set 42 and the housing 28. A first counter gear G1 fixed to the carrier K1 of the first planetary gear set 40 meshes with a second counter gear G2 fixed to the ring gear R3 of the third planetary gear set 46. In the under drive portion U/D, the carrier K3 and sun gear S3 of the third planetary gear set 46 are connected to each other through the clutch C3, and the brake B3 and the one-way clutch F2 are disposed in parallel with each other between the sun gear S3 and the housing 28.

Figure 2:
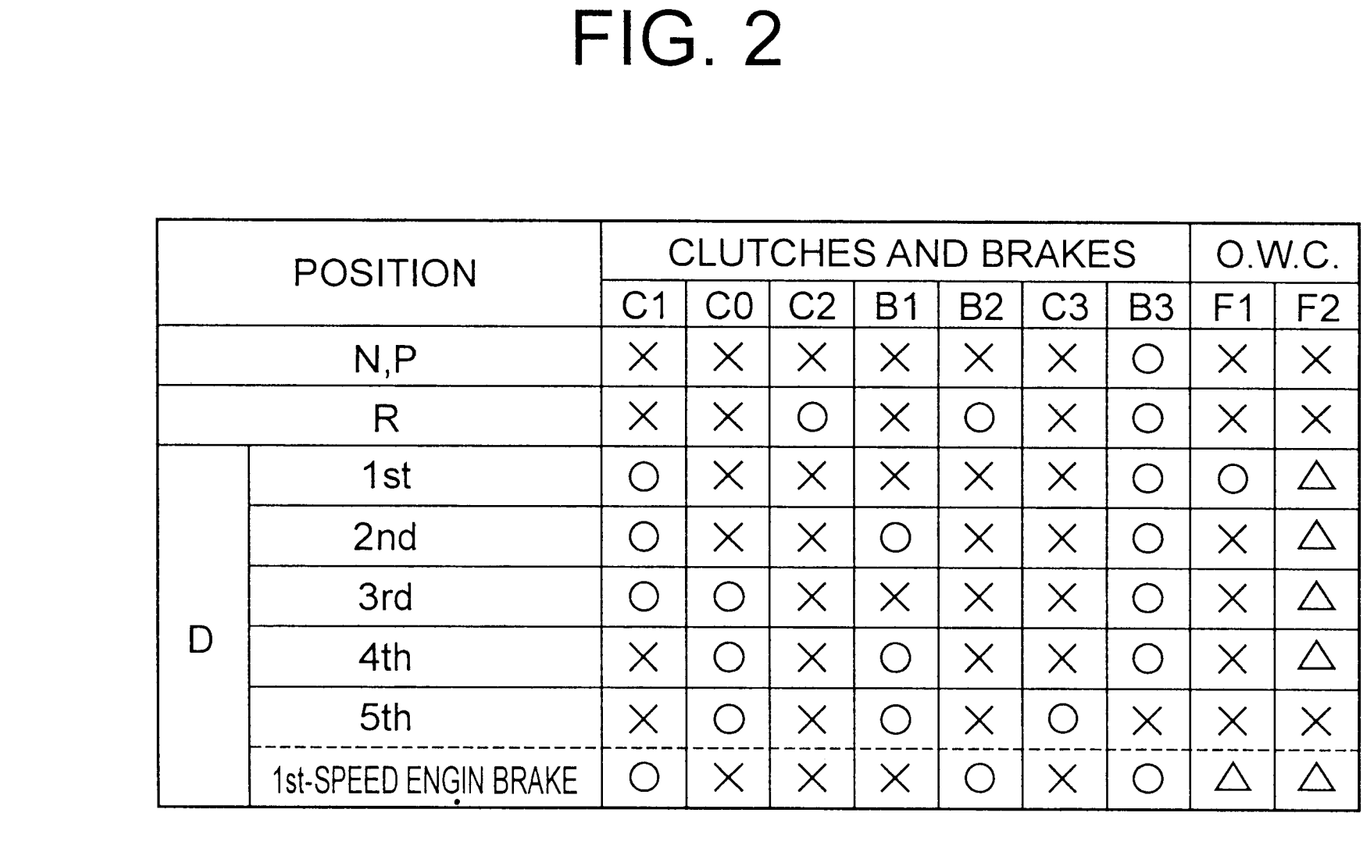
FIG. 2 is a view indicating a relationship between combinations of operating states of frictional coupling devices in the form of clutches and brakes of the automatic transmission of FIG. 1, and operating positions of the automatic transmission which are established by the respective combinations.

Each of the clutches C0, C1, C2, C3 and the brakes B1, B2, B3 (hereinafter referred to collectively as "clutches C" and "brakes B" where appropriate) is a hydraulically operated frictional coupling device such as a multiple-disc clutch or band brake, which is operated by a hydraulic actuator. The clutches C and brakes B are selectively engaged and released to selectively establish the five forward drive positions and one rear drive position, as indicated in FIG. 2, by way of example, by switching actions in a hydraulic control circuit 84 (shown in FIG. 3). The five forward drive positions of the automatic transmission 14 consist of a $1^{st}$-speed position, a $2^{nd}$-speed position, a $3^{rd}$-speed position, a $4^{th}$-speed position and a $5^{th}$-speed position. In FIG. 2, "o" and "x" represent an engaged state and a released state of the clutches C, brakes B and one-way clutches F, respectively, and "Δ" represents an engaged state of the one-way clutches F when a drive force is transmitted to the front drive wheels. For instance, the automatic transmission 14 is shifted up from the $4^{th}$-speed position to the $5^{th}$-speed position by engaging the clutch C3, and shifted down from the $5^{th}$-speed position to the $4^{th}$-speed position by releasing the clutch C3. Further, the automatic transmission 14 is shifted up from the $1^{st}$-speed position to the $2^{nd}$-speed position by engaging the brake B1, and shifted down from the $2^{nd}$-speed position to the first-speed position by releasing the brake B1. However, a shift-up action of the automatic transmission from the $2^{nd}$-speed position to the $3^{rd}$-speed position is achieved by engaging the clutch C0 while concurrently releasing brake B1, and a shift-down action from the $3^{rd}$-speed position to the $2^{nd}$-speed position is achieved by releasing the clutch C0 while concurrently engaging the brake B1. Similarly, a shift-up action from the $3^{rd}$-speed position to the $4^{th}$-speed position is achieved by releasing the clutch C1 while concurrently engaging the brake B1, and a shift-down action from the $4^{th}$-speed position to the $3^{rd}$-speed position is achieved by engaging the clutch C1 while concurrently releasing the brake B1. Thus, those shift-up and shift-down actions are achieved by concurrent engaging and releasing actions of respective two frictional coupling devices.

Figure 3:
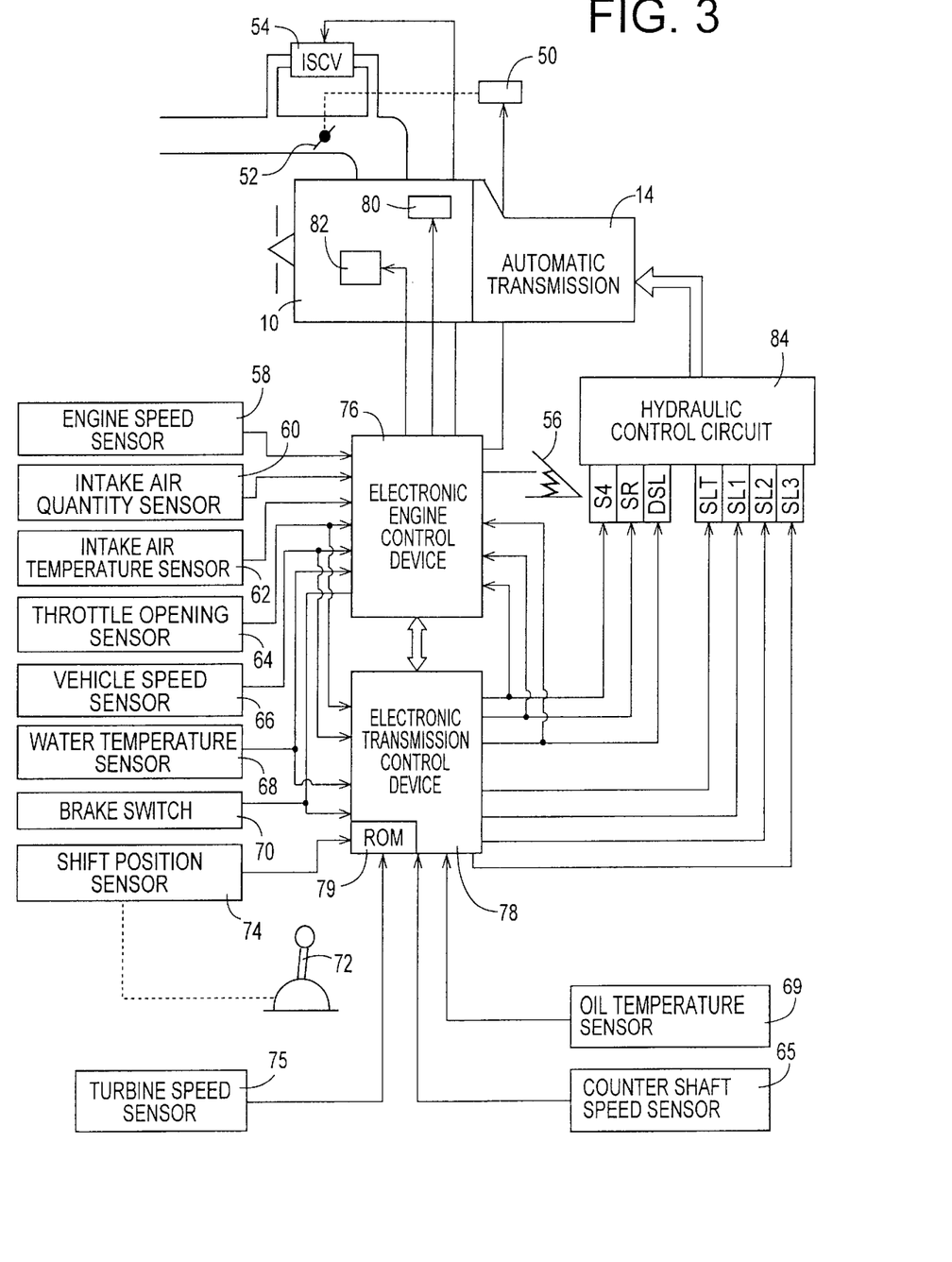
FIG. 3 is a block diagram showing a control system incorporating the automatic transmission control apparatus according to one embodiment of this invention in the form of an electronic transmission control device for controlling the automatic transmission of FIG. 1.

Referring to the block diagram of FIG. 3, there is shown a control system incorporating an automatic transmission control apparatus constructed according to one embodiment of this invention in the form of an electronic transmission control device 78 for controlling the automatic transmission 14 of the vehicle drive system shown in FIG. 1. The control system includes an electronic engine control device 76 for controlling the engine 10, as well as the electronic transmission control device 78. A throttle valve 52 is disposed in an intake pipe of the engine 10. The throttle valve 52 is operated by a throttle actuator 50, which is controlled by the electronic engine control 76 such that an opening angle $\theta_{TH}$ of the throttle valve 56 corresponds to an operating amount $A_{CC}$ of an accelerator pedal 56. A by-pass passage is connected to the intake pipe, so as to by-pass the throttle valve 52, and is provided with an ISC valve (idling speed control valve) 54, which functions to control an intake air quantity introduced into the engine 10 when the throttle valve 52 is placed in its idling position. Namely, the ISC valve 54 is capable of controlling an idling speed $NE_{IDL}$ of the engine 10. The ISC valve 54 is controlled by the electronic engine control device 76. The electronic engine control device 76 and the electronic transmission control device 78 receive output signals of various sensors and switches, which include a signal representative of the operating amount $A_{CC}$ of the accelerator pedal 56. The sensors and switches include: an engine speed sensor 58 for detecting an operating speed NE of the engine 10; an intake air quantity sensor 60 for detecting an intake air quantity Q introduced into the engine 10; an intake air temperature sensor 62 for detecting a temperature $T_A$ of the intake air; a throttle opening sensor 64 for detecting the opening angle $\theta_{TH}$ of the throttle valve 52; a counter shaft speed sensor 65 for detecting a rotating speed $N_C$ of the second counter gear G2; a vehicle speed sensor 66 for detecting a running speed V of the vehicle; a water temperature sensor 68 for detecting a temperature $T_W$ of a cooling water of the engine 10; an oil temperature sensor 69 for detecting a temperature $T_{OIL}$ of a working fluid in the automatic transmission 14; a brake switch 70 for detecting an operating state BK of a braking system (not shown); a shift position sensor 74 for detecting a presently selected position PSH of a shift lever 72; and a turbine speed sensor 75 for detecting a rotating speed NT of the turbine impeller 24, which is equal to a rotating speed $N_{IN}$ of the input shaft 22.

Figure 4:
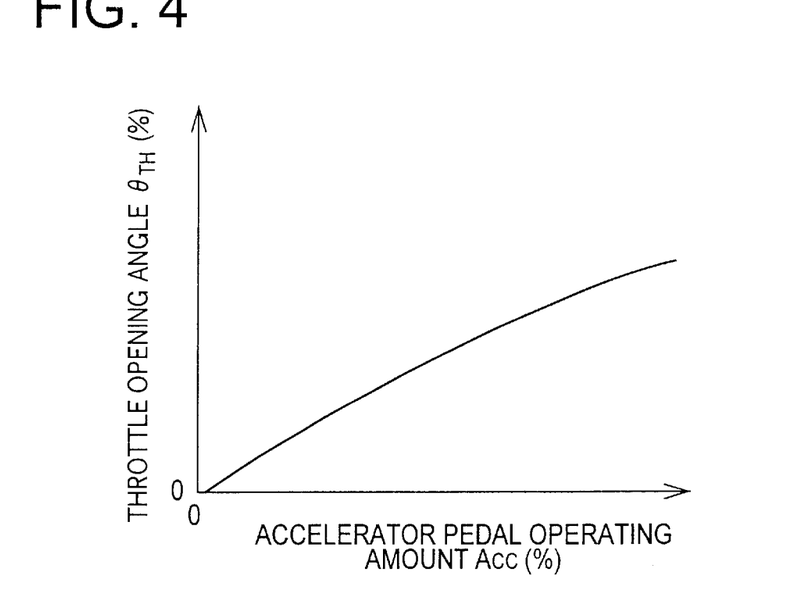
FIG. 4 is a graph indicating an example of a predetermined relationship between an operating amount $A_{CC}$ of an accelerator pedal and an opening angle $\theta_{TH}$ of a throttle valve, which relationship is used by the electronic transmission control device of FIG. 3 to control the throttle valve.

The electronic engine control device 76 is constituted principally by a microcomputer incorporating a central processing unit (CPU), a random-access memory (RAM), a read-only memory (ROM), and an input-output interface. The CPU of the control device 76 operates to process input signals according to programs stored in the ROM, while utilizing a temporary data storage function of the RAM, for effecting various controls of the engine 10, such as a fuel injection control of controlling a fuel injector valve 80 to control an amount of a fuel to be injected into the engine 10, an ignition timing control of controlling an igniter 82 to control the ignition timing of the engine 10, and a throttle opening control of controlling the throttle valve 52 to control its opening angle $\theta_{TH}$ on the basis of the operating amount $A_{CC}$ of the accelerator pedal 56 and according to a predetermined relationship between the opening angle $\theta_{TH}$ and the operating amount $A_{CC}$, as indicated in the graph of FIG. 4 by way of example. This predetermined relationship is represented by a data map or equation stored in the ROM. The CPU of the electronic engine control device 76 is further adapted to effect an idling speed control of controlling the ISC valve 54 to control the idling speed $N_{IDL}$ of the engine 10.

Figure 5:
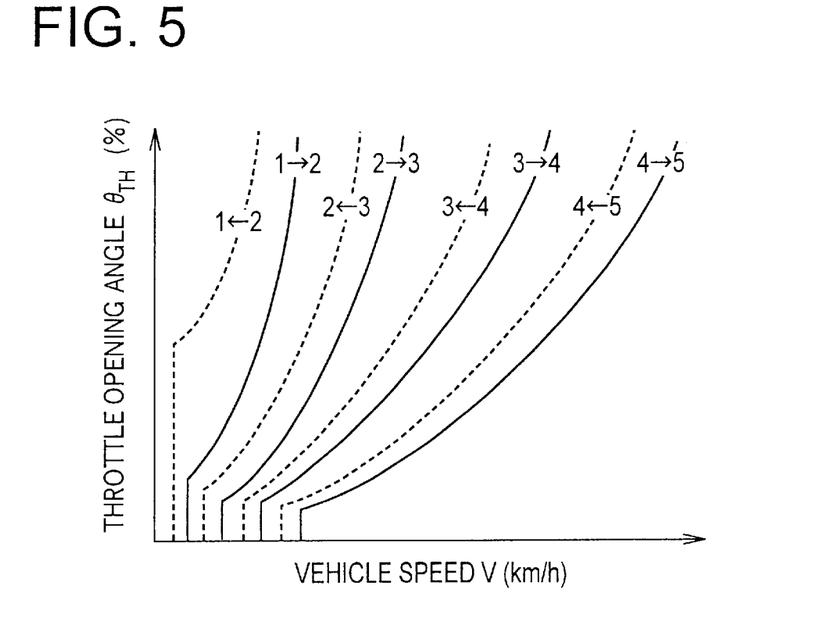
FIG. 5 is a graph showing an example of shift-up and shift-down boundary lines which are used by the electronic transmission control device of FIG. 3, to control shifting actions of the automatic transmission.

Like the electronic engine control device 76, the electronic transmission control device 78 is constituted principally by a microcomputer whose CPU operates to process input signals according to programs stored in the ROM, while utilizing a temporary data storage function of the RAM, for controlling solenoid-operated values and linear solenoid vales of the hydraulic control circuit 84. For instance, the control device 76 controls shifting up and down the automatic transmission 14 on the basis of the detected opening angle $\theta_{TH}$ of the throttle valve 52 and the detected vehicle running speed V, and according to predetermined shift-up and shift-down boundary lines represented by data maps stored in the ROM 79 of the control device 78. In the graph of FIG. 5, the shift-up boundary lines are indicated by solid line, while the shift-down boundary lines are indicated by broken lines. These boundary lines represent relationships between the throttle opening angle $\theta_{TH}$ and vehicle speed V. Described in detail, the forward drive position to which the automatic transmission 14 must be shifted up or down is determined on the basis of the detected opening angle $\theta_{TH}$ and vehicle speed V, and according to the predetermined shift-up and shift-down boundary lines. The automatic transmission 14 is shifted up or down depending upon whether a point defined by the detected opening angle $\theta_{TH}$ and vehicle speed V has moved across any one of the shift-up and shift-down boundary lines in a shift-up or shift-down direction. The above-indicated point represents the specific running condition of the vehicle. The electronic transmission control device 78 also controls the operating state of the lock-up clutch 24. The automatic transmission 14 is shifted to the determined operating position, by suitably controlling the solenoid-operated valves S4, SR and DSL and liner solenoid valves SLT, SL1, SL2 and SL3.

Figure 6:
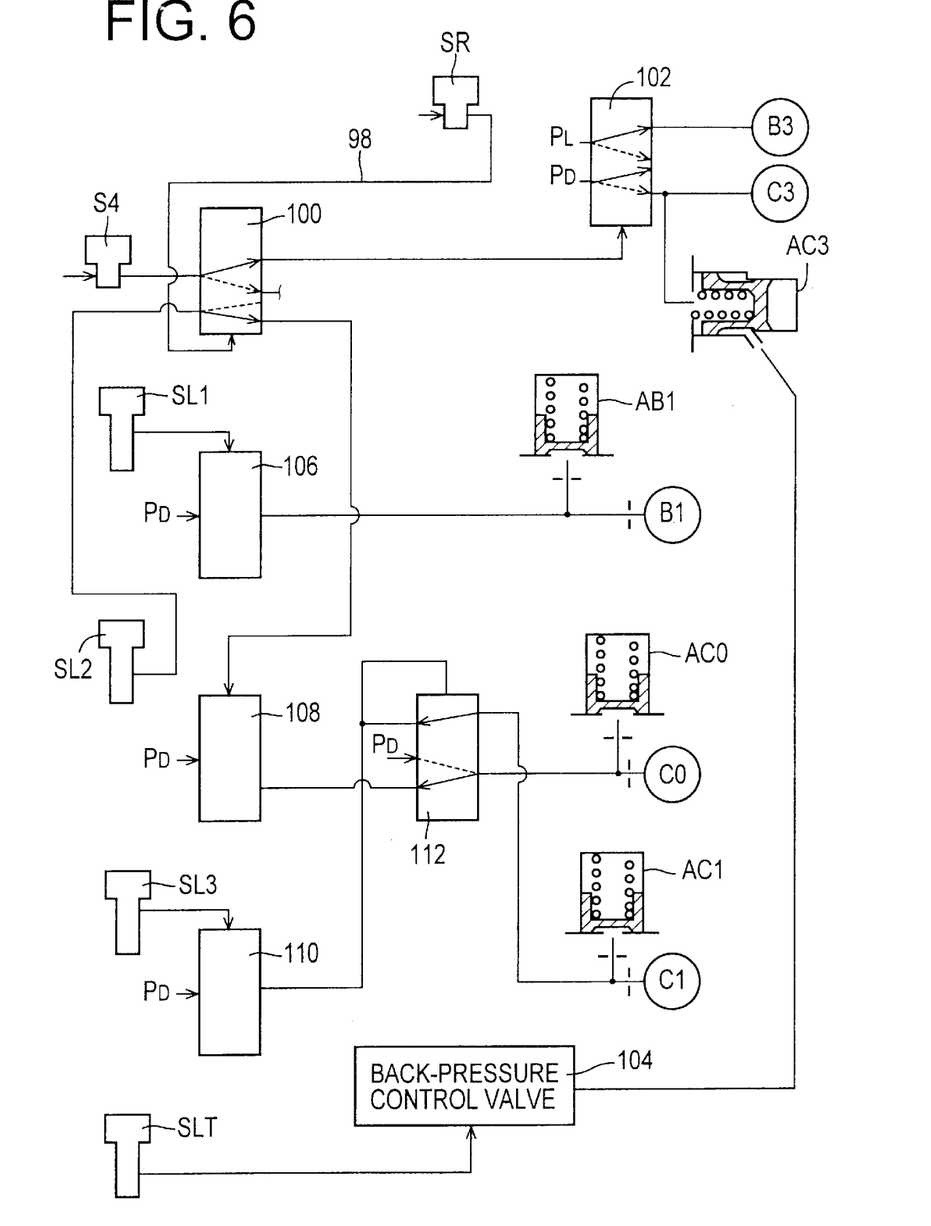
FIG. 6 is a hydraulic circuit diagram schematically showing an arrangement of a hydraulic control circuit shown in FIG. 3.

Referring next to FIG. 6, there is schematically shown major elements of the hydraulic control circuit 84. In the hydraulic control circuit 84, the solenoid-operated valve SR is connected to a 2-3 shift valve 100 through a comparatively long fluid passage 98. An output pressure of the solenoid-operated valve SR is applied to the 2-3 shift valve 100, under the control of the electronic transmission control device 78, to selectively place the 2-3 shift valve 100 in one of a $1^{st}$-$2^{nd}$ speed position and a $3^{rd}$-$5^{th}$ speed position. The solenoid-operated valve S4 is connected to the 2-3 shift valve 100. An output pressure of this valve S4 is applied to a 4-5 shift valve 102 through the 2-3 shift valve 100 placed in its $3^{rd}$-$5^{th}$ speed position, under the control of the control device 78, to selectively place the 4-5 shift valve 102 in a $1^{st}$-$4^{th}$ speed position and a $5^{th}$ speed position. That is, a forward-drive pressure PD is applied to the brake B3 when the 4-5 shift valve 102 is placed in the $1^{st}$-$4^{th}$ speed position, and is applied to the clutch C3 and an accumulator AC3 for the clutch C3, when the 4-5 shift valve 102 is placed in the $5^{th}$ speed position. The linear solenoid valve SLT is connected to a back-pressure control valve 104. An output pressure of the linear solenoid valve SLT is applied to the back-pressure control valve 104 under the control of the electronic transmission control device 78, to generate back pressure corresponding to the output pressure, so that the back pressure is applied to a back-pressure port of the accumulator AC3 for the clutch C3.

The linear solenoid valve SL is connected to a B1 control valve 106. An output pressure of this linear solenoid valve SL is applied to the B1 control valve 106 under the control of the transmission control valve 78, to generate an engaging pressure $P_{B1}$ corresponding to the output pressure, so that the engaging pressure $P_{B1}$ is applied to the brake BI and an accumulator ABI for the brake B1. The linear solenoid valve SL2 is also connected to the 2-3 shift valve 100. An output pressure of this linear solenoid valve SL2 is applied to a C0 control valve 108 through the 2-3 shift valve 100 under the control of the transmission control device 78, to generate an engaging pressure $P_{C0}$ corresponding to the output pressure, so that the engaging pressure $P_{C0}$ is applied to the clutch C0 and an accumulator AC0 for the clutch C0. The linear solenoid valve SL3 is connected to a C1 control valve 110. An output pressure of this linear solenoid valve SL3 is applied to the C1 control valve 110 under the control of the transmission control device 78, to generate an engaging pressure $P_{C0}$ corresponding to the output pressure, so that the engaging pressure $P_{C1}$ is applied to the clutch C1 and an accumulator AC1 for the clutch C1. The engaging pressure $P_{C0}$, $P_{C1}$ are applied to the clutches C0, C1, respectively, through a clutch-pressure control valve 112 whose operating position is determined by the engaging pressure $P_{C1}$.

Figure 7:
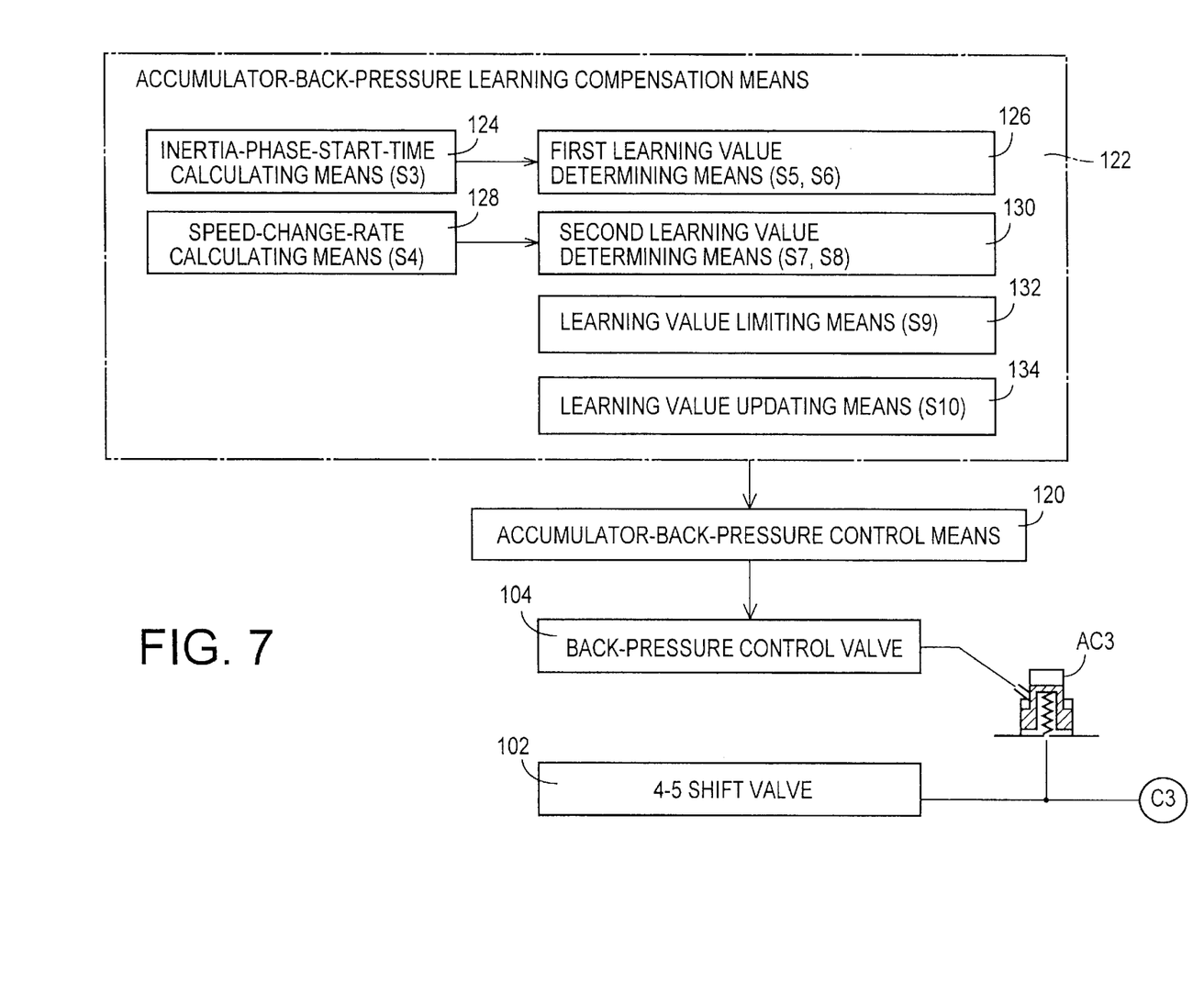
FIG. 7 is a block diagram illustrating major functional means of the electronic transmission control device of FIG. 3.

Referring next to the block diagram of FIG. 7, there are illustrated major functional means of the electronic transmission control device 78, which serves as the automatic transmission control apparatus according to this embodiment of the present invention. The transmission control device 78 includes accumulator-back-pressure control means 120, and accumulator-back-pressure learning compensation means 122. The accumulator-back-pressure control means 120 is arranged to adjust the back pressure of the accumulators for the hydraulically operated frictional coupling devices associated with shift-up and shift-down actions of the automatic transmission 14, such that the engaging pressures of those frictional coupling devices are slowly changed according to an input torque of the automatic transmission 14. For example, the accumulator-back-pressure control means 120 is arranged to determine a basic back pressure of the accumulator AC3 connected to the clutch C3 which is engaged or released to effect the shift-up action of the automatic transmission 14 from the $4^{th}$-speed position to the $5^{th}$-speed position and the shift-down action from the $5^{th}$-speed position to the $4^{th}$-speed position. Described in detail, the accumulator-back-pressure control means 120 determines the basic back pressure of the accumulator AC3 such that the basic back pressure increases with an increase in a parameter representative of or corresponding to the output torque of the engine 10 or the input toque of the automatic transmission 14. For instance, the parameter used by the accumulator-back-pressure control means 120 may be selected from among: opening angle $\theta_{TH}$ of the throttle valve 52; amount of fuel injection by the fuel injector 80; operating amount $A_{CC}$ of the accelerator pedal 56; estimated output torque of the engine 10; and estimated input torque of the automatic transmission 14. The accumulator-back-pressure control means 120 determines a duty-ratio control signal $D_{SLT}$ indicative of a duty ratio of the linear solenoid valve SLT, on the basis of the determined basic back pressure, so that a hydraulic signal corresponding to the determined basic back pressure is applied from the linear solenoid valve SLT to the back-pressure control valve 104, whereby the determined back pressure is applied from the back-pressure control valve 104 to the accumulator AC3.

The accumulator-back-pressure learning compensation means 122, which is connected to the accumulator-back-pressure control means 120, is provided to effect learning compensation of the back pressure of the accumulator of the hydraulically operated frictional coupling device to be engaged or released to effect a shifting action of the automatic transmission 14, such that an inertia-phase-start time $T_T$ coincides with or approaches a predetermined target value, and such that a rate of change of the rotating speed of that rotary element coincides with or approaches a predetermined target value. The inertial-phase-start time $T_T$ is a period of time from a moment at which the automatic transmission 14 is commanded to effect the shifting action, to a moment of initiation of a change of the rotating speed of the above-indicated selected rotary element as a result of the shifting action. Where the shifting action of the automatic transmission 14 is effected by a releasing action of a frictional coupling device and an engaging action of one-way clutch, the accumulator-back-pressure learning compensation means 122 is arranged to effect learning compensation of the back pressure of the accumulator connected to the frictional coupling device, such that the one-way clutch is engaged while the pressurized fluid is fed into an accumulator chamber of the accumulator.

The accumulator-back-pressure learning compensation means 122 includes inertial-phase-start-time calculating means 124, first learning value determining means 126, speed-change-rate calculating means 128, second learning value determining means 130, learning value limiting means 132 and learning value updating means 134. For example, the inertia-phase-start-time calculating means 124 is arranged to calculate the actual value of the inertia-phase-start time $T_T$ which is a time length between a moment at which the automatic transmission 14 is commanded by the transmission control device 78 to be shifted down from the $5^{th}$-speed position to the $4^{th}$-speed position, and a moment of initiation of a change of the rotating speed of the selected rotary element, such as the speed NE of the engine crankshaft 18, speed $N_{IN}$ of the transmission input shaft 22, or speed $N_C$ of the second counter gear G2. The first learning value determining means 126 is arranged to determine a first learning value $\Delta D_{SLT1}$ of the duty-ratio control signal $D_{SLT}$ of the linear solenoid valve SLT, such that the calculated actual value of the inertia-phase-start time $T_T$ approaches or coincides with a predetermined target value $TT_M$, namely, such that a difference of the actual value of the inertia-phase-start time $T_T$ from the target value $T_{TM}$ is reduced or zeroed. In the present embodiment, the first learning value determining means 126 determines the first learning value on the basis of the difference $(T_T-T_{TM})$, such that the calculated actual value of the inertia-phase-start time $T_T$ is held within a predetermined range between $(T_{TM}-a)$ and $(T_{TM}+b)$. The speed-change-rate calculating means 128 is arranged to calculate the actual value of a rate of change R of the rotating speed of the selected rotary element, for instance, a rate of change NE, $N_{IN}$ or $N_C$ of the engine crankshaft speed NE, transmission input shaft speed $N_{IN}$ or counter shaft speed $N_C$, during the shifting period or inertia phase (e.g., about 150 milliseconds) of the automatic transmission. The second learning value determining means 130 is arranged to determine a second learning value $\Delta D_{SLT2}$ of the duty-ratio control signal $D_{SLT}$, such that the actual value of the rate of change R of the speed of the selected rotary element approaches or coincides with a predetermined target value $R_M$, namely, such that a difference of the actual value of the rate of change R from the target value $R_M$ is reduced or zeroed. In the present embodiment, the second learning value determining means 130 determines the second learning value on the basis of the difference $(R-R_M)$, such that the calculated actual value of the target value $R_M$ is held within a predetermined range between $(R_M-c)$ and $(R_M+d)$. The learning value limiting means 132 is arranged to limit the first and second learning values $\Delta D_{SLT1}$ and $\Delta D_{SLT2}$ determined by the first and second learning value determining means 126, 130, to within a predetermined range between predetermined upper and lower limits, so that a learning value $\Delta D_{SLT}$ of the duty-ratio control signal $D_{SLT}$ is smoothly changed. The learning value updating means 134 is arranged to update the first and second learning values $\Delta D_{SLT1}$ and $\Delta D_{SLT2}$ limited by the learning value limiting means 132. The accumulator-back-pressure control means 120 obtained an updated duty-ratio control signal $D_{SLT}$ on the basis of the first and second learning values $\Delta D_{SLT1}$ and $\Delta D_{SLT2}$ updated by the accumulator-back-pressure learning compensation means 122, according to the following equation:

$$D_{SLT}=D_{SLT}+\Delta D_{SLT1}+\Delta D_{SLT2}$$

Figure 8:
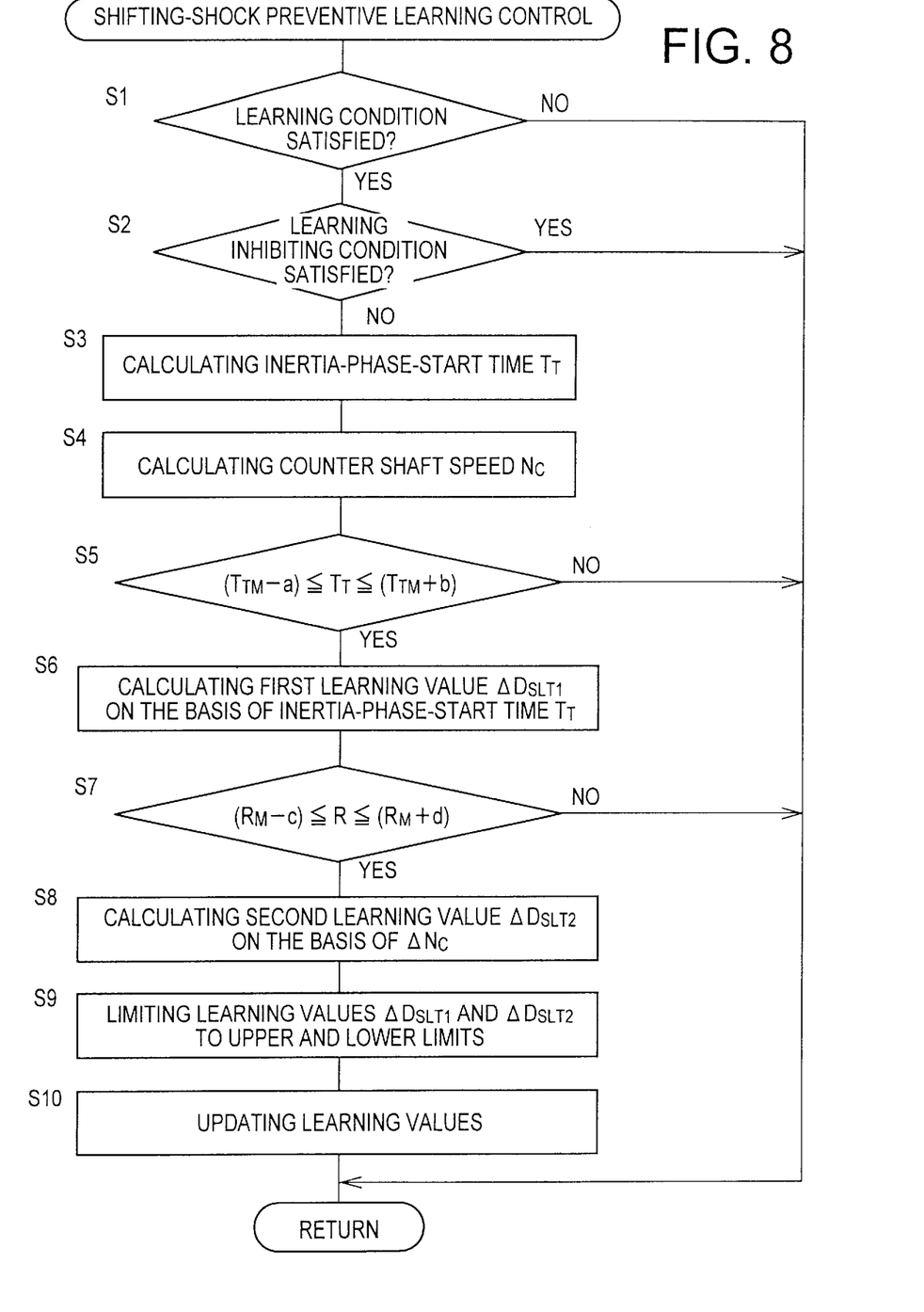
FIG. 8 is a flow chart illustrating a shifting-shock preventive control routine executed by the electronic transmission control device of FIG. 3.

Referring further to the flow chart of FIG. 8, there is illustrated a shifting-shock preventive control routine executed by the electronic transmission control device 78. This control routine may be executed when the automatic transmission 14 is commanded to be shifted down from the $5^{th}$-speed position to the $4^{th}$-speed position, for example, or when it is determined that this shift-down action is required to be effected. The control routine of FIG. 8 is initiated with step S1 to determine whether a predetermined learning condition is satisfied. For instance, this learning condition is satisfied when all of the three following conditions are satisfied:

1) A command to effect the shift-down action from the $5^{th}$-speed position to the $4^{th}$-speed position is present.
2) A LOW-FRICTION-COEFFICIENT ROAD SURFACE flag is placed in an OFF state.
3) The operating amount$_{ACC}$ of the accelerator pedal 56 is held larger than a predetermined threshold for more than a predetermined time.

The LOW-FRICTION-COEFFICIENT ROAD SURFACE flag is placed in an ON state while the vehicle is running on a road surface whose friction coefficient $\mu$ is lower than a predetermined lower limit. The flag placed in the ON state indicates that the learning compensation of the duty-ratio control signal $D_{SLT}$ should be inhibited. If a negative decision (NO) is obtained in step S1, one cycle of execution of the control routine of FIG. 8 is terminated. If an affirmative decision (YES) is obtained in step S1, the control flow goes to step S2 to determine whether a predetermined learning inhibiting condition is satisfied. For example, this learning inhibiting condition is satisfied when any one of the following conditions is not satisfied:

1) A LEARNING INHIBIT flag is placed in an OFF state.
2) The main shifting portion MG of the automatic transmission 14 is not in the process of a shifting action.
3) The under drive portion U/D of the automatic transmission 14 is not placed in a torque-control inhibiting state.
4) The linear solenoid valve SLT and solenoid-operated valves SR and S4 for shifting the automatic transmission 14 between the $4^{th}$-speed and $5^{th}$-speed positions are all normally operable.
5) The shifting patterns of the automatic transmission 14 have not been changed with the water temperature $T_W$ being lower than a predetermined lower limit.
6) The oil temperature $T_{OIL}$ of the working fluid is held within a normal operating range between 50° C. and 130° C., for example.
7) The vehicle running speed V is held within a predetermined range between 60 km/h and 180 km/h, for instance.

8) The vehicle is in an accelerating state with the estimated input torque $T_{IN}$ of the automatic transmission 14 being larger than a predetermined threshold.
9) The acceleration of the vehicle is in a stable state, with the rate of increase of the opening angle $\theta_{TH}$ of the throttle valve 52 or the operating amount $A_{CC}$ of the accelerator pedal 56 being held smaller than a predetermined upper limit.

If an affirmative decision (YES) is obtained in step S2, that is, if the learning inhibiting condition is satisfied, one cycle of execution of the control routine of FIG. 8 is terminated.

If a negative decision (NO) is obtained in step S2, that is, if the learning inhibiting condition is not satisfied, the control flow goes to step S3 corresponding to the inertia-phase-start-time calculating means 124, to calculate the inertia-phase-start time $T_T$, which is a time length from a point of time t1 (indicated in FIG. 9) at which the automatic transmission 14 is commanded to be shifted down from the $5^{th}$-speed position to the $4^{th}$-speed position during an operation of the accelerator pedal 56, to a point of time t2 (FIG. 9) at which the inertia phase of the automatic transmission 14 is initiated with an increase of the counter shaft speed $N_C$ being initiated. Step S3 is followed by step S4 corresponding to the speed-change-rate calculating means 128, to calculate the counter shaft speed $N_C$. Then, the control flow goes to steps S5 and S6 corresponding to the first learning value determining means 126. Step S5 is provided to determine whether the inertia-phase-start time $T_T$ is held within a predetermined range of the target value $T_{TM}$, for example, within a range between ($T_{TM}$−a) and ($T_{TM}$+b). If a negative decision (NO) is obtained in step S5, one cycle of execution of the control routine of FIG. 8 is terminated. If an affirmative decision "YES" is obtained in step S5, the control flow goes to step S6 to determine the first learning value $\Delta D_{SLT1}$, so that the inertia-phase-start time $T_T$ is held within the predetermined range between ($T_{TM}$−a) and ($T_{TM}$+b).

Step S6 is followed by steps S7 and S8 corresponding to the second learning value determining means 130. Step S7 is provided to determine whether the rate of change R of the counter shaft speed $N_C$ is held within a predetermined range of the target value $R_M$, for example, within a range between ($R_M$−c) and ($R_M$+d). If a negative decision (NO) is obtained in step S7, one cycle of execution of the control routine of FIG. 8 is terminated. If an affirmative decision "YES" is obtained in step S7, the control flow goes to step S8 to determine the second learning value $\Delta D_{SLT2}$ so that the rate of change R is held within the predetermined range between ($R_M$−c) and ($R_M$+d).

Then, the control flow goes to step S9 corresponding to the learning value limiting means 132, to limit the first and second learning values $\Delta D_{SLT1}$ and $\Delta D_{SLT2}$ such that and these values $\Delta D_{SLT1}$ and $\Delta D_{SLT2}$ are held within a predetermined range, that is, such that the duty-ratio control signal $D_{SLT}$ is slowly changed at a sufficiently low rate. Step S9 is followed by step S10 corresponding to the learning value updating means 134, to update the learning values.

Figure 9:
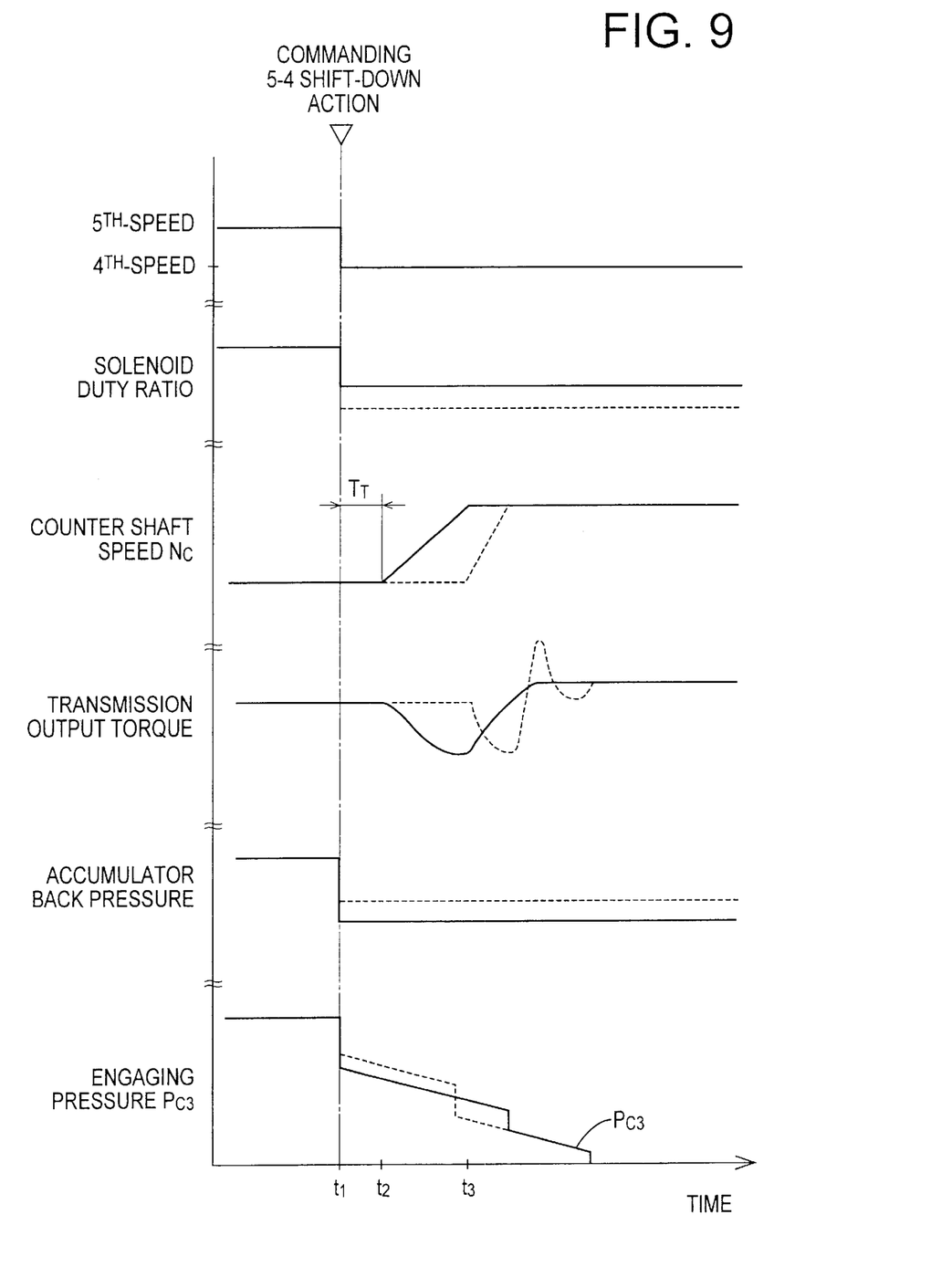
FIG. 9 is a time chart indicating changes of various parameters when the automatic transmission is shifted down from a fifth-speed position to a fourth-speed position under the control of the electronic transmission control device of FIG. 3.

Referring to the time chart of FIG. 9, there are indicated changes of various parameters when the shift-down action of the automatic transmission 14 from the $5^{th}$-speed position to the $4^{th}$-speed position is effected under the control of the electronic transmission control device 78 while the accelerator pedal 56 is in an operated state. In the time chart, the shift-down action of the automatic transmission 14 is commanded at the point of time t1. The inertia-phase-start-time calculating means 124 calculates the inertia-phase-start time $T_T$ from the moment t1 of commanding of the shift-down action to the moment t2 of initiation of an increase of the counter shaft speed $N_C$, and the speed-change-rate calculating means 128 calculates the rate of subsequent increase R of the counter shaft speed $N_C$. The first learning value determining means 126 determines the first learning value $\Delta D_{SLT1}$ so that the inertia-phase-start time $T_T$ coincides with the target value $T_{TM}$, and the second learning value determining means 130 determines the second learning value $\Delta D_{SLT2}$ so that the rate of increase R of the counter shaft speed $N_C$ coincides with the target value $R_M$. As a result, the duty-ratio of the linear solenoid SLT represented by the duty-ratio control signal $D_{SLT}$ to be sued for the next shift-down action of the automatic transmission 14 from the $5^{th}$-speed position to the $4^{th}$-speed position is reduced from a value indicated by a broken line to a value indicated by a solid line in FIG. 9. Accordingly, the back pressure of the accumulator AC3 is increased from a value indicated by a broken line to a value indicated by a solid line. Consequently, an amount of variation of the output torque of the automatic transmission 14 upon engagement of the one-way clutch F2, that is, at a point of time t3 is reduced from a value indicated by a broken line to a value indicated by a solid line, so that the shifting shock of the automatic transmission 14 is accordingly reduced.

The electronic transmission control device 78 according to the illustrated embodiment described above is arranged such that the accumulator-back-pressure learning compensation means 122 implements steps S3 through S10 of the control routine of FIG. 8 for effecting learning compensation of the back pressure of the accumulator AC3 such that the calculated rate of change R of the counter shaft speed $N_C$ approaches the predetermined target value $T_M$, so that the shifting shock of the automatic transmission 14 can be more effectively reduced irrespective of a variation in the shifting time, than in the prior art in which the learning compensation of the back pressure of the accumulator is based on the shifting time. The present transmission control device 78 prevents the accumulator AC3 from being inoperable, even where the shifting time of the automatic transmission has a large amount of variation, thus enabling the accumulator AC3 to perform the intended function of slowing changing or reducing the rate of change of the hydraulic engaging pressure of the clutch C3, to thereby effectively reduce the shifting shock of the automatic transmission.

In addition, the accumulator-back-pressure learning compensation means 122 permits the inertia-phase-start time $T_T$ to approach with the predetermined target value $T_{TM}$, preventing the accumulator AC3 from being inoperable due to an excessively large amount of variation in the shifting time of the automatic transmission. That is, the learning compensation means 122 is arranged to suitably adjust the time length from the moment at which the automatic transmission 14 is commanded to effect the shift-down action from the $5^{th}$-speed position to the $4^{th}$-speed position while the accelerator pedal 56 is in an operated state, to the moment at which an increase of the counter shaft speed $N_C$ is initiated. This arrangement assures an improved stability in the function of the accumulator AC3 of reducing the rate of change of the hydraulic engaging pressure of the clutch C3, so as to effectively reduce the shifting shock of the automatic transmission.

The accumulator-back-pressure learning compensation means 122 is further arranged to effect the learning compensation of the back pressure of the accumulator AC3, upon the shift-down action from the $5^{th}$-speed position to the $4^{th}$-speed position, with the relating action of the clutch C3 and the engaging action of the one-way clutch F2, such that the one-way clutch F2 is engaged while the pressurized fluid is fed into the accumulator chamber of the accumulator AC3. This arrangement is effective to reduce the shifting shock of the transmission upon engagement of the one-way clutch F2.

The automatic transmission 14 to be controlled by the transmission control device 78 is constructed for use on a front-engine front-drive (FF) vehicle, and includes the main shifting portion MG disposed on the input shaft 22, and the under drive portion U/D disposed on the counter shaft 44 parallel to the input shaft 22. The shift-down action of the automatic transmission 14 from the $5^{th}$-speed position to the $4^{th}$-speed position takes place in the under drive portion U/D. The second counter gear G2 which is an input member of the under drive portion U/D is used as the selected rotary element whose rate of change R of rotating speed is used by the second learning value determining means 130 of the present transmission control device 78. Thus, the present transmission control device 78 is effective to reduce the shifting shock of the automatic transmission 14 which is arranged for use on the FF vehicle and which includes the under drive portion U/D disposed on the counter shaft 44 parallel to the input shaft 22 on which the main shifting portion MG is disposed.

Further, the accumulator-back-pressure learning compensating means 122 is arranged to effect the learning compensation of the back pressure of the accumulator AC3 such that the back pressure is lowered when the rate of change R of the detected counter shaft speed $N_C$ is lower than the target value $R_M$, in the process of the shift-down action of the automatic transmission 14 from the $5^{th}$-speed position to the $4^{th}$-speed position during an operation of the accelerator pedal 56. This arrangement is effective to reducing the shifting shock upon the above-indicated shift-down action, irrespective of a variation of the shifting time.

While one preferred embodiment of this invention has been described above by reference to the accompanying drawings, it is to be understood that the invention may be otherwise embodied.

The automatic transmission control apparatus according to the present invention is equally applicable to any types of automatic transmission other than the automatic transmission 14 described above with respect to the illustrated embodiment. Although the automatic transmission 14 is adapted to an FF vehicle (front-engine front drive vehicle) and has the five forward drive positions, the principle of the present invention is applicable to an automatic transmission having less or more than five forward drive positions, and an automatic transmission adapted to an FR vehicle (front-engine rear-drive vehicle).

In the illustrated embodiment, the transmission control device 78 controls the shift-down action which takes place in the under drive portion U/D of the automatic transmission, the automatic transmission control apparatus according to the present invention is applicable to a shifting action which takes place in the main shifting portion MG. The shifting action to be controlled by the control apparatus is not limited to the shift-down action from the $5^{th}$-speed position to the $4^{th}$-speed position during an operation of the accelerator pedal 56.

While the illustrated embodiment is arranged to determine the first and second learning values $\Delta D_{SLT1}$ and $\Delta D_{SLT2}$ for thereby compensating the duty-ratio control signal $D_{SLT}$, other learning values may be used for learning compensation of the duty ratio control signal $D_{SLT}$.

It is to be understood that the present invention may be embodied with various other changes, modifications and improvements which may occur to those skilled in the art, without departing from the spirit and scope of the present invention defined in the appended claims.

What is claimed is:

1. An apparatus for controlling a vehicle automatic transmission having a hydraulically operated frictional coupling device operable to effect a shifting action of the automatic transmission, and an accumulator connected to said frictional coupling device, said apparatus comprising:

accumulator-back-pressure learning compensation means for effecting learning compensation of a back pressure of said accumulator such that an actual value of a rate of change of a rotating speed of a selected one of rotary elements of said automatic transmission, which rotating speed changes as a result of said shifting action, approaches a predetermined first target value; and accumulator-back-pressure control means for controlling said back pressure of said accumulator, on the basis of an output of said accumulator-back-pressure learning compensation means, wherein said accumulator-back-pressure learning compensation means effects the learning compensation of said back pressure of said accumulator such that an actual value of an inertia-phase-staff time approaches a predetermined second target value while said actual value of said rate of change approaches said predetermined first target value, said inertia-phase-staff time being a period of time from a moment at which said automatic transmission is commanded to effect said shifting action, to a moment of initiation of a change of the rotating speed of said selected rotary element as a result of said shifting action.

2. An apparatus according to claim 1, wherein said shifting action of the automatic transmission is effected by a releasing action of said hydraulically operated frictional coupling device and an engaging action of a one-way clutch, and said accumulator-back-pressure learning compensation means effects the learning compensation of said back pressure of said accumulator such that said one-way clutch is engaged while a pressurized fluid is fed into an accumulator chamber of said accumulator.

3. An apparatus according to claim 1, wherein said automatic transmission is adapted to a front-engine front-drive vehicle, and includes a main shifting portion disposed on an input shaft thereof, and an under drive portion disposed on a counter shaft which is spaced from and parallel to said input shaft, and said shifting action is a shift-down action which takes place in said under drive portion, said selected rotary element consisting of an input member of said under drive portion.

4. An apparatus according to claim 3, wherein said under drive portion includes a clutch which is provided as said hydraulically operated frictional coupling device and which is released to effect said shift-down action, and said accumulator is connected to said clutch to slowly change a hydraulic engaging pressure of said clutch in the process of a releasing action of said clutch.

5. An apparatus according to claim 4, wherein said accumulator-back-pressure learning compensation means effects the learning compensation of the back pressure of said accumulator such that said back pressure is lowered when the rate of change of the rotating speed of said input member of said under drive portion of the automatic transmission is lower than a predetermined target value in the process of said shift-down action which takes place during an operation of an accelerator pedal provided on said front-engine front-drive vehicle.

6. An apparatus according to claim 1, wherein said accumulator-back-pressure learning compensation means includes:

inertia-phase start-time calculating means for calculating said actual value of said inertia-phase-start time;

speed-change rate calculating means for calculating said actual value of said rate of change of the rotating speed of the selected rotary element of the automatic transmission;

first learning value determining means for determining a first learning value for learning compensation of said back pressure of said accumulator, such that said actual value of said inertia-phase-start time calculated by said inertia-phase-start-time calculating means coincides with said predetermined second target value; and second learning value determining means for determining a second learning value for learning compensation of said back pressure, such that said actual value of said rate of change of the rotating speed of said selected rotary element calculated by said speed-change-rate calculating means coincides with said predetermined first target value, and wherein said accumulator-back-pressure control means controls said back pressure of said accumulator, on the basis of said first and second learning values determined by said first learning value determining means and said second learning value determining means.

* * * * *